(12) United States Patent
Jia et al.

(10) Patent No.: US 9,391,731 B2
(45) Date of Patent: Jul. 12, 2016

(54) NYQUIST WAVELENGTH DIVISION MULTIPLEXING SYSTEM

(71) Applicant: ZTE (USA) Inc., Austin, TX (US)

(72) Inventors: Zhensheng Jia, Morganville, NJ (US); Jianjun Yu, Basking Ridge, NJ (US); Hung-Chang Chien, Bridgewater, NJ (US)

(73) Assignee: ZTE (USA) Inc., Austin, TX (US)

( * ) Notice: Subject to any disclaimer, the term of this patent is extended or adjusted under 35 U.S.C. 154(b) by 0 days.

(21) Appl. No.: 13/778,434

(22) Filed: Feb. 27, 2013

(65) Prior Publication Data
US 2013/0223843 A1 Aug. 29, 2013

Related U.S. Application Data

(60) Provisional application No. 61/604,978, filed on Feb. 29, 2012.

(51) Int. Cl.
| | |
|---|---|
| *H04B 10/61* | (2013.01) |
| *H04B 10/60* | (2013.01) |
| *H04J 14/02* | (2006.01) |
| *H04J 14/06* | (2006.01) |

(52) U.S. Cl.
CPC .......... *H04J 14/02* (2013.01); *H04J 14/06* (2013.01); *H04J 14/0254* (2013.01)

(58) Field of Classification Search
CPC ........ H04J 14/02; H04J 14/06; H04J 14/0254
USPC ............................. 398/182–201, 79, 202–214
See application file for complete search history.

(56) References Cited

U.S. PATENT DOCUMENTS

| | | | | |
|---|---|---|---|---|
| 5,325,318 | A  * | 6/1994 | Harris et al. ................... | 708/313 |
| 5,867,542 | A  * | 2/1999 | Iwamatsu et al. ............. | 375/354 |
| 6,330,273 | B1 * | 12/2001 | Hulbert et al. ................ | 375/150 |
| 7,110,475 | B2 * | 9/2006 | Jun ............................... | 375/326 |
| 7,215,623 | B2 * | 5/2007 | Nakahira .......... | G11B 20/10009 |
| | | | | 369/59.16 |
| 7,315,575 | B2 * | 1/2008 | Sun et al. ....................... | 375/229 |
| 7,492,292 | B2 * | 2/2009 | Mezer et al. ................... | 341/118 |
| 7,532,822 | B2 * | 5/2009 | Sun et al. ...................... | 398/155 |
| 7,636,525 | B1 * | 12/2009 | Bontu et al. ................... | 398/208 |

(Continued)

FOREIGN PATENT DOCUMENTS

| | | |
|---|---|---|
| JP | 2011234325 A | 11/2011 |

OTHER PUBLICATIONS

Li et al , Enhanced Digital Coherent Receiver for High Spectral Efficiency Dual Polarization Quadrature Duobinary Systems, Sep. 2010, ECOC, pp. 1-3.*

(Continued)

*Primary Examiner* — Ken N Vanderpuye
*Assistant Examiner* — Dibson Sanchez
(74) *Attorney, Agent, or Firm* — Drinker Biddle & Reath LLP

(57) ABSTRACT

Aspects of the present invention include apparatus and methods for transmitting and receiving signals in communication systems. A beam splitter splits an optical signal into a plurality of signals. At least one QPSK modulator generates a plurality of QPSK modulated signals from the plurality of signals. An optical multiplexer combines the plurality of QPSK modulated signals into a multiplexed signal. The multiplexed signal is then transmitted.

14 Claims, 6 Drawing Sheets

(56) References Cited

U.S. PATENT DOCUMENTS

| | | | |
|---|---|---|---|
| 8,073,338 B2* | 12/2011 | Buelow | 398/184 |
| 8,095,018 B2* | 1/2012 | Sekine et al. | 398/198 |
| 8,249,467 B2* | 8/2012 | Roberts et al. | 398/205 |
| 8,306,431 B2* | 11/2012 | Takahara | 398/152 |
| 8,406,638 B2* | 3/2013 | Hoshida | 398/202 |
| 8,417,126 B2* | 4/2013 | Mandai et al. | 398/184 |
| 8,463,121 B2* | 6/2013 | Xu et al. | 398/27 |
| 8,478,137 B2* | 7/2013 | Komaki et al. | 398/208 |
| 8,639,118 B2* | 1/2014 | Wu | H04B 10/616 398/140 |
| 8,655,190 B2* | 2/2014 | Wu et al. | 398/202 |
| 8,670,680 B2* | 3/2014 | Tanaka et al. | 398/208 |
| 8,681,027 B2* | 3/2014 | Abe et al. | 341/120 |
| 8,682,175 B2* | 3/2014 | Forghieri | H04B 10/07953 398/162 |
| 8,737,840 B2 | 5/2014 | Nakamoto | |
| 8,768,177 B2* | 7/2014 | Wu | H04J 14/026 398/194 |
| 8,781,326 B2* | 7/2014 | Hu et al. | 398/76 |
| 2004/0013435 A1* | 1/2004 | Eiselt et al. | 398/140 |
| 2004/0081470 A1* | 4/2004 | Griffin | 398/188 |
| 2004/0091273 A1* | 5/2004 | Brissette et al. | 398/175 |
| 2008/0198051 A1* | 8/2008 | Tanimura et al. | 341/137 |
| 2008/0199191 A1* | 8/2008 | Essiambre et al. | 398/208 |
| 2009/0190926 A1* | 7/2009 | Charlet et al. | 398/74 |
| 2010/0232796 A1* | 9/2010 | Cai | 398/79 |
| 2010/0296819 A1* | 11/2010 | Kahn et al. | 398/158 |
| 2011/0076019 A1* | 3/2011 | Rahn et al. | 398/208 |
| 2011/0142449 A1* | 6/2011 | Xie | H04B 10/60 398/65 |
| 2011/0176813 A1* | 7/2011 | Kim et al. | 398/147 |
| 2011/0217040 A1* | 9/2011 | Mori | 398/53 |
| 2011/0236025 A1* | 9/2011 | Wagner et al. | 398/115 |
| 2011/0243561 A1* | 10/2011 | Li et al. | 398/65 |
| 2011/0274442 A1* | 11/2011 | Zhang | H04B 10/0779 398/208 |
| 2011/0291865 A1* | 12/2011 | Sun | H03H 17/0621 341/61 |
| 2012/0121274 A1* | 5/2012 | Fludger | 398/208 |
| 2012/0134667 A1* | 5/2012 | Westlund | H04B 10/64 398/25 |
| 2012/0213510 A1* | 8/2012 | Stojanovic | 398/25 |
| 2012/0251112 A1* | 10/2012 | Sadot | H04B 10/613 398/65 |
| 2013/0308960 A1* | 11/2013 | Horikoshi | H03H 21/0012 398/209 |

OTHER PUBLICATIONS

Li et al, Spectrally Efficient Quadrature Duobinary Coherent Systems With Symbol Rate Digital Signal Processing, Apr. 2011, IEEE, JLT, vol. 29, No. 8, pp. 1098-1104.*

Bosco et al, Performance Limits of Nyquist WDM and CO OFDM in High Speed PM QPSK Systems, Aug. 2010, IEEE, PTL, vol. 22, No. 15, pp. 1129-1131.*

Zhang et al, ADC Bandwidth Optimization for Coherent Optical Detection in Phase Modulated Systems, Nov. 2009, IEEE, pp. 1-2.*

Dong et al., "Ultra-dense WDM-PON delivering carrier-centralized NyquistWDM uplink with digital coherent detection", Optics Express, vol. 19, Issue 12, pp. 11100-11105, May 23, 2011, XP055063822.

Bosco et al., "On the Performance of Nyquist-WDM Terabit Superchannels Based on PM-BPSK, PM-QPSK, PM8QAM or PM-16QAM Subcarriers", Journal of Lightwave Technology, IEEE Service Center, New York, NY, US, Val. 29, No. 1, Jan. 1, 2011, pp. 53-61, XP011348554.

Cheng et al., "Super receiver design for superchannel coherent optical systems", Next-Generation Optical Communication: Components, Sub-Systems, and Systems, SPIE, 1000 20th St. Bellingham WA 98225-6705, USA, vol. 8284, No. 1, Jan. 21, 2012, pp. 1-8, XP060000996.

Gavioli et al., "100Gb/s WDM NRZ-PM-QPSK long-haul transmission experiment over installed fiber probing non-linear reach with and without DCUs", 35th European Conference on Optical Communication, 2009. ECOC '09, Vienna, Austria, IEEE, Piscataway, NJ, USA, Sep. 20, 2009, pp. 1-2, XP031546309.

Yu, "System solutions toward terabit/s per channel", Optoeelectronics and Communications Conference (OECC), 2011 16th, IEEE, Jul. 4, 2011, pp. 220-221, XP032051061.

Zhou et al., "Multi-Level, Multi-Dimensional Coding for High-Speed and High-Spectral-Efficiency Optical Transmission", Journal of Lightwave Technology, U.S.A., IEEE, Aug. 15, 2009, Vo. 27, Issue 16, pp. 3641-3653.

* cited by examiner

NYQUIST WAVELENGTH DIVISION MULTIPLEXING SYSTEM

CROSS-REFERENCE TO RELATED APPLICATIONS

This application claims priority to U.S. provisional application No. 61/604,978 which was filed on Feb. 29, 2012.

FIELD OF THE INVENTION

The field of the present invention is communication systems, and particularly, Nyquist wavelength division multiplexing (WDM).

BACKGROUND

As the traffic in communication systems continues to grow rapidly, particularly for video, mobile data, and cloud services, advanced modulation formats offering higher spectral efficiency (SE), such as 16 QAM have been considered to increase the total fiber capacity to meet the demand. However, higher modulation orders increase an implementation penalty and decrease receiver sensitivity, resulting in a higher required optical signal to noise ratio (OSNR). To avoid this higher requirement, another approach SE in WDM systems is to reduce the channel spacing between the individual channels, by either relying on orthogonality among neighboring channels in frequency domain (Coherent Optical OFDM) or in time domain (Nyquist WDM).

The CO-OFDM may require a larger receiver bandwidth and a higher analog-to-digital converter (ADC) sampling rate than Nyquist WDM. However, Nyquist WDM shows a more robust performance in terms of practical implementation. FIG. 1 shows the two technologies. It would be advantageous to implement a Nyquist WDM transmission system with coherent detection.

SUMMARY OF THE INVENTION

Aspects of the present invention employ Nyquist WDM to transmit signals realizing high-spectral efficiency over long distances.

In one aspect of the present invention include apparatus and methods for transmitting and receiving signals in communication systems. A beam splitter splits an optical signal into a plurality of signals. At least one QPSK modulator generates a plurality of QPSK modulated signals from the plurality of signals. An optical multiplexer combines the plurality of QPSK modulated signals into a multiplexed signal. The multiplexed signal is then transmitted.

DETAILED DESCRIPTION OF EMBODIMENTS

Aspects of the present invention employ Nyquist WDM to transmit signals realizing high-spectral efficiency over long distances.

Figure 1:
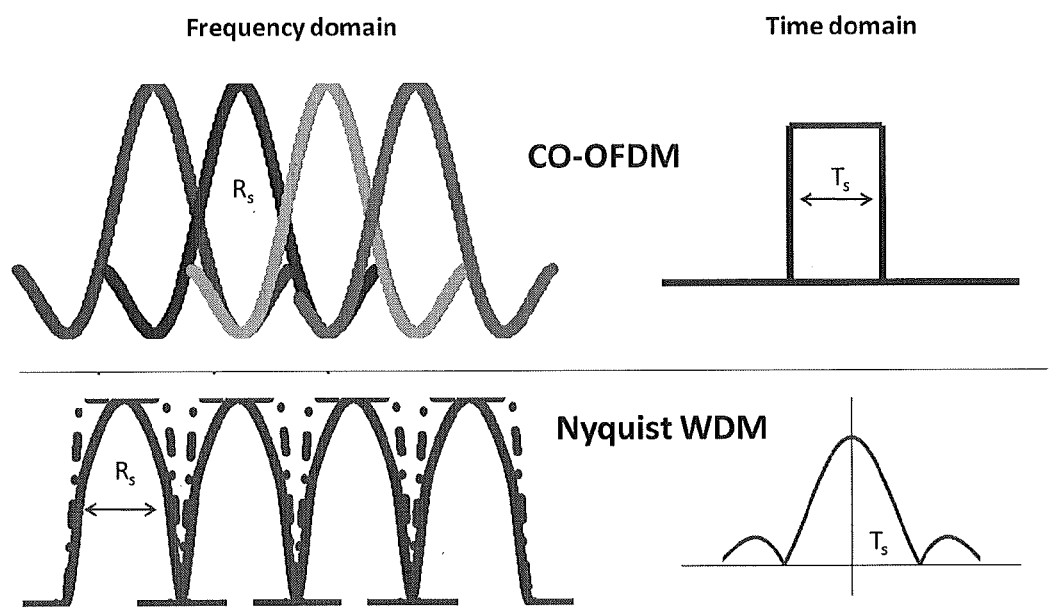
FIG. 1 illustrates an example of Coherent Optical Orthogonal Frequency Division Multiplexing (OFDM) and Nyquist WDM.
Figure 2:
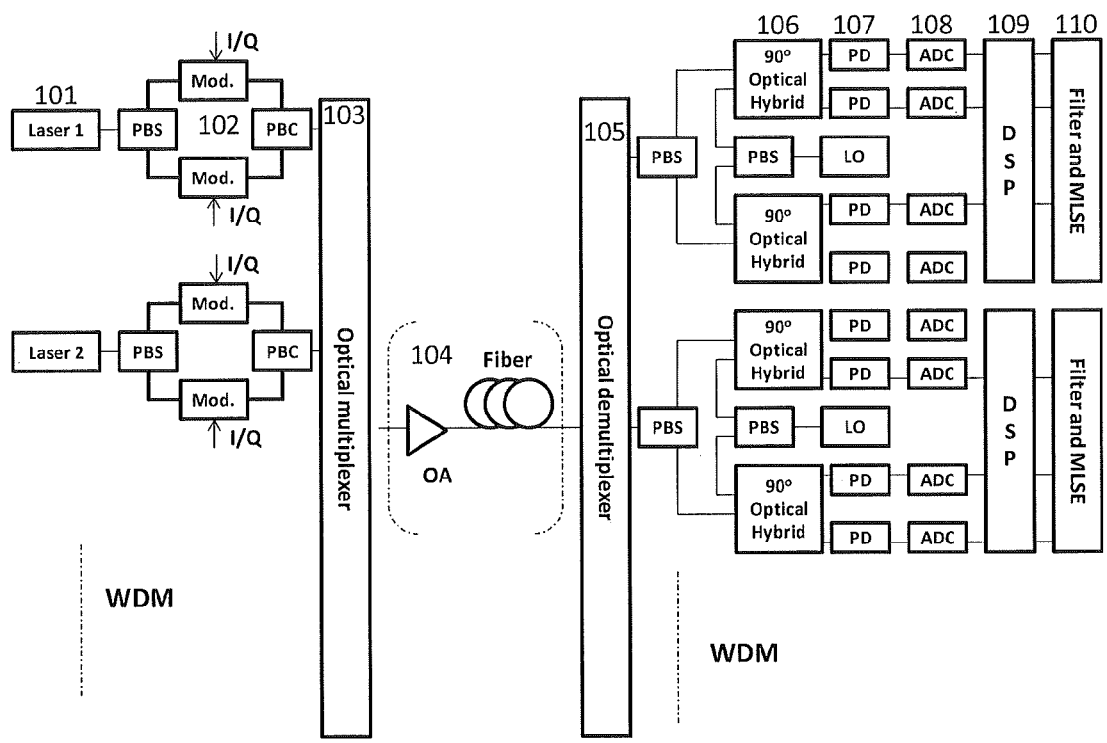
FIG. 2 illustrates a Nyquist WDM transmission system with coherent detection according to aspects of the present invention.

FIG. 2 illustrates a schematic diagram of a transmitter and receiver according to aspects of the present invention. A laser 101 generates a continuous lightwave. The laser 101 may be a distributed feedback type laser diode DFB-LD, which may have a wide line width. For a 100 Gbit/s QPSK, a line width smaller than 2 MHz is sufficient. Although line widths greater than 2 MHz may also be sufficient. Alternatively, the laser source 101 may be a tunable external laser with a narrow line width and low phase noise which may be preferred for high level modulation format signals. The lightwave is split by a polarization beam splitter (PBS), of which each is modulated by a quadrature phase shift keying (QPSK) optical modulator. These modulated lightwaves are then combined by a polarization beam combiner (PBC) to realize polarization multiplexed QPSK modulated signals. This non-return-zero (NRZ)—QPSK modulation may be realized by cascaded serial or parallel modulators. Different modulation format modulators may also be used, such as 8 PSK, 8 QAM or a higher level modulator. Then an optical multiplexer 103 with a narrow-band optical filtering function may be used to perform aggressive spectrum shaping and multiplexing to obtain a Nyquist (symbol bandwidth=channel spacing) or faster-than Nyquist WDM signals (symbol bandwidth<channel spacing). This optical multiplexer 103 may be a WSS (wavelength-selective switch) filter which may be used for a few channels, a tunable optical filter, which may be used for one channel, an optical interleaver which may be used for WDM channels, or Fiber Bragg grating, which may be used for one channel. A transmission link 104 may be uncompensated for chromatic dispersion consisting of an optical amplifier (OA) and fiber at each span. The optical amplifier may be an erbium doped fiber amplifier (EDFA), a Raman amplifier, or the like. The optical fiber any various type of fiber, such as G.652 or a G.655 fiber.

Figure 3:
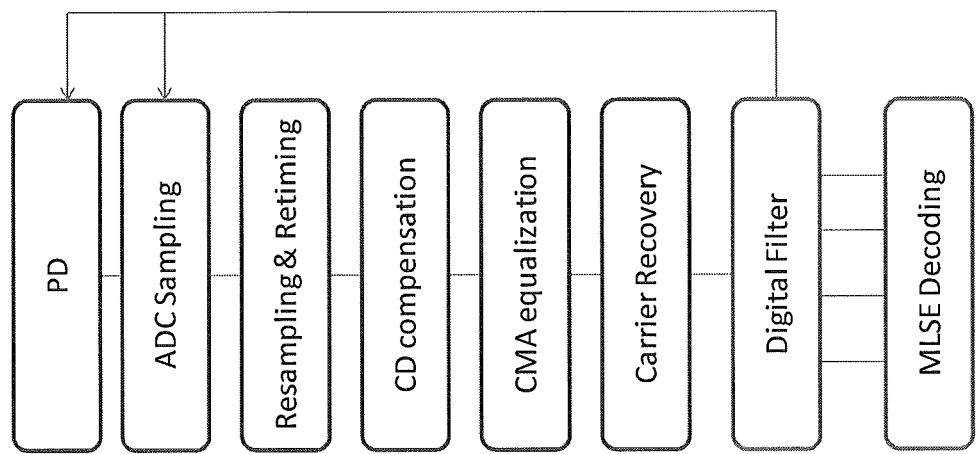
FIG. 3 illustrates a digital signal processing process according to aspects of the present invention.

After transmission of the signals, an optical demultiplexer 105 may demultiplex the WDM channels and route them for coherent detection. The optical demultiplexer 105 may be a WSS filter, which may be used for a few channels, a tunable optical filter, which may be for one channel, an optical interleaver, which may be used for WDM channels, or a Fiber Bragg grating, which may be used for one channel. At the receiver, a coherent detection technique employs a local oscillation (LO) signal after the PBS is launched into the 90° optical hybrid 106 with polarization split incoming transmitted signal. The diversified signals are sent to a photodiode (PD) 107 and digitally sampled with an analog-to-digital converter (ADC) 108. As shown in FIG. 3, a digital signal processing (DSP) unit 109 then compensates the front end 106 and 107 and retiming 108, and equalizes the static and dynamic linear impairments. The DSP unit includes re-sampling and clock recovery, linear chromatic dispersion compensation in time or frequency domain, constant modulus algorithm for adaptive polarization demultiplexing, polarization mode dispersion, and residual chromatic dispersion. The following carrier recovery may be to compensate for the frequency offset and carrier phase noise.

Figure 4:
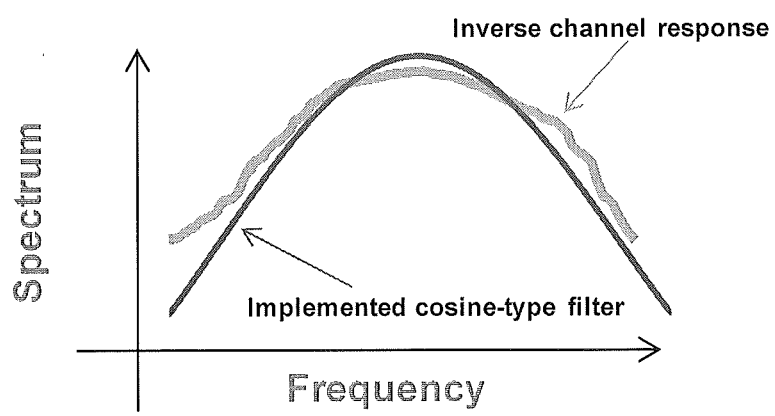
FIG. 4 illustrates a signal spectrum before and after filtering.
Figure 4:
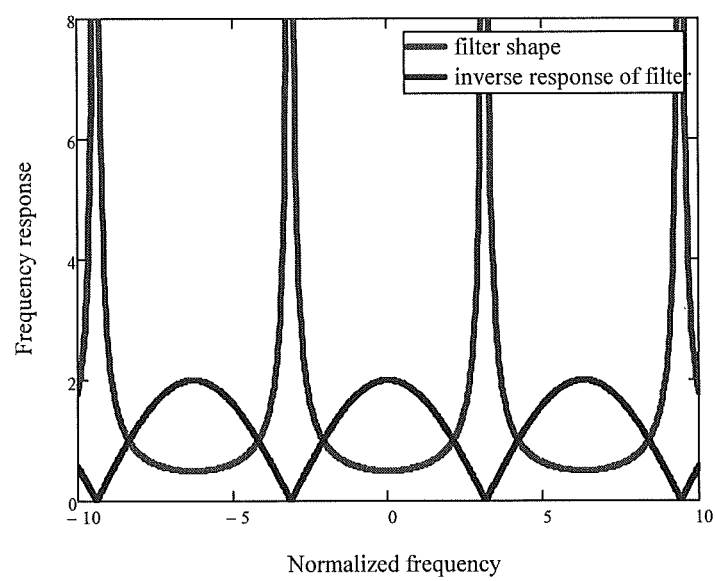
Figure 5:
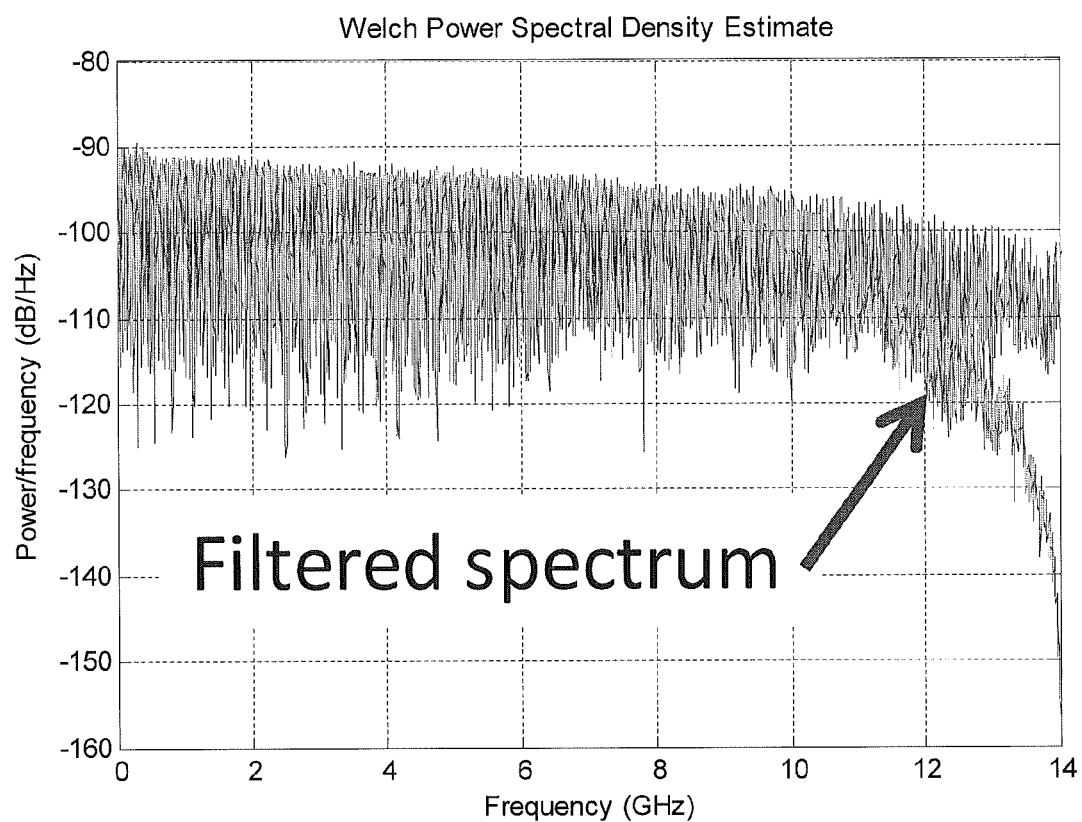
FIG. 5 shows experimental validation results describing that an ADC as small as 12-13 GHz bandwidth for coherent detection in 28 Gbaud PDM QPSK signals over 25 GHz optical spacing.
Figure 6:
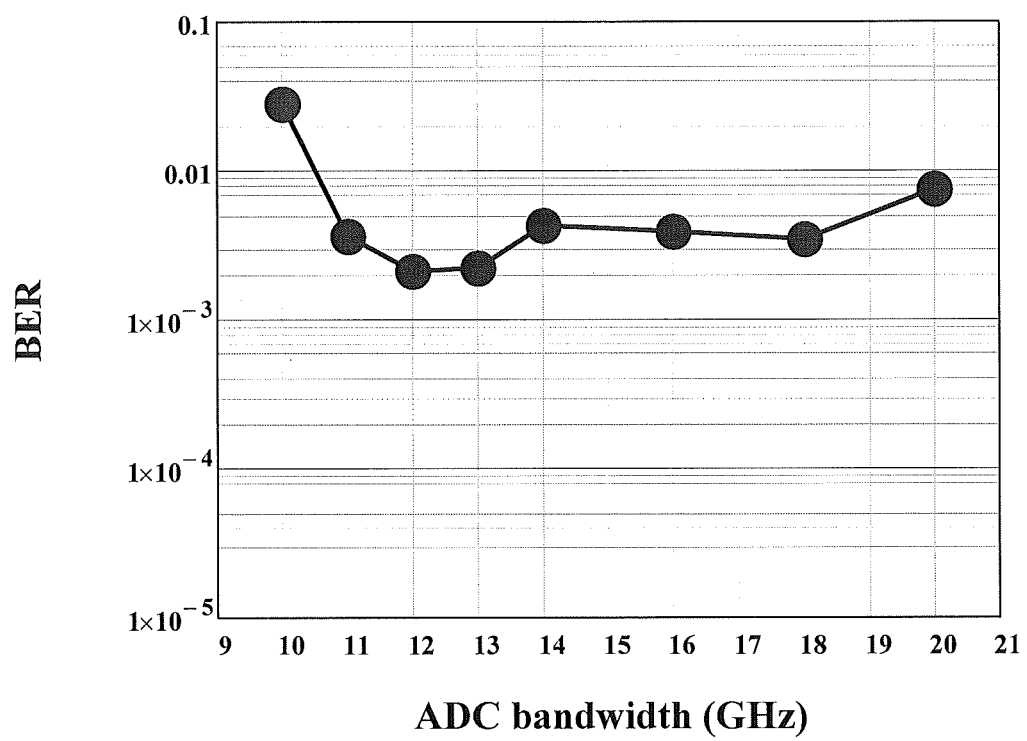
FIG. 6 shows a digital filter, MLSE decoding and an inverse channel response according to aspects of the present invention.

A digital filter may be added CMA and carrier phase recovery. The digital filter performs the function of removing a part of the high-frequency components in the signal spectrum, which relaxes the bandwidth requirement of the ADC and PD. This additional digital filter and maximum likelihood sequence estimation (MLSE) algorithms are used to suppress noise and crosstalk to realize optimum detection 110 in strong filtering channels in a Nyquist WDM. The required ADC bandwidth may be reduced to realize optimal detection. FIG. 4 shows the ideal filter shape having an inverse channel response after the regular DSP unit, like the cosine-type filter. The bandwidth requirement of a photodiode may also be reduced. The filtered spectrum is shown in FIG. 5. The experimental results are shown in FIG. 6. It can by seen that around half of the strong filter bandwidth may be need for sufficient performance. This is because the employment of a digital filter after a DSP unit removes the high-frequency components of a processed channel.

It should be understood that the methods and devices of the present invention may be executed employing machines and apparatus including simple and complex computers. Moreover, the architecture and methods described above can be stored, in part or in full, on forms of machine-readable media. For example, the operations of the present invention could be stored on machine-readable media, such as magnetic disks or optical disks, which are accessible via a disk drive (or computer-readable medium drive). Alternatively, the logic to perform the operations as discussed above, could be implemented in additional computer and/or machine readable media, such as discrete hardware components as large-scale integrated circuits (LSI's), application-specific integrated circuits (ASIC's), firmware such as electrically erasable programmable read-only only memory (EEPROM's); and the like. Implementations of certain embodiments may further take the form of machine-implemented, including web-implemented, computer software.

While aspects of this invention have been shown and described, it will be apparent to those skilled in the art that many more modifications are possible without departing from the inventive concepts herein. The invention, therefore, is not to be restricted except in the spirit of the following claims.

What is claimed is:

1. A method of recovering information bits from a received signal in which information bits are recovered using a post digital filter and maximum likelihood sequence estimation (MLSE), decoding, the method comprising:
   receiving a signal in a Nyquist coherent optical receiver, wherein the signal is a Nyquist WDM signal or a faster-than Nyquist WDM signal;
   generating a plurality of digital samples from the received signal using a polarization beam splitter, a 90° optical hybrid, a photodiode and an analog to digital converter (ADC);
   performing digital signal processing (DSP) in the Nyquist coherent optical receiver to generate a plurality of values;
   applying the post-digital filter to remove a sufficient portion of high frequency components from a signal output of the DSP to reduce a bandwidth requirement of the photodiode and the ADC; and
   performing a maximum likelihood sequence estimation (MLSE) on the plurality of digital samples.

2. The method of claim 1, wherein the performing DSP comprises resampling and clock recovery.

3. The method of claim 1, wherein the performing DSP step comprises linear chromatic dispersion compensation in a time or frequency domain.

4. The method of claim 1, wherein the performing DSP step comprises a constant modulus algorithm for adaptive polarization multiplexing.

5. The method of claim 1, wherein the performing DSP step comprises a polarization mode dispersion.

6. The method of claim 1, wherein the performing DSP step comprises a residual chromatic dispersion.

7. The method of claim 1, wherein the (ADC) is operated at a bandwidth between 11 and 14 GHz.

8. A method of transmitting and detecting a Nyquist WDM signal comprising:
   generating a continuous lightwave;
   splitting the continuous lightwave with a polarization beam splitter (PBS) and modulating split lightwaves with a quadrature phase shift keying (QPSK) optical modulator to form modulated lightwaves;
   combining the modulated lightwaves with a polarization beam combiner (PBC) to form a plurality of polarization multiplexed QPSK modulated signals;
   performing aggressive spectrum shaping and multiplexing of the plurality of polarization multiplexed QPSK modulated signals to form a signal, wherein the signal is a Nyquist WDM signal or a faster-than Nyquist WDM signal;
   transmitting the signal;
   receiving the signal in a Nyquist coherent optical receiver;
   generating a plurality of digital samples from the received signal using a polarization beam splitter, a 90° optical hybrid, a photodiode and an analog to digital converter (ADC);
   performing digital signal processing (DSP) in a Nyquist coherent receiver to generate a plurality of values;
   applying the post-digital filter to remove a sufficient portion of high frequency components from a signal output of the DSP to reduce a bandwidth requirement of the photodiode and the ADC; and
   performing a maximum likelihood sequence estimation (MISE) on the plurality of digital samples.

9. The method of claim 8, wherein the (ADC) is operated at a bandwidth between 11 and 14 GHz.

10. The method of claim 8, wherein the performing DSP comprises resampling and clock recovery.

11. The method of claim 8, wherein the performing DSP step comprises linear chromatic dispersion compensation in a time or frequency domain.

12. The method of claim 8, wherein the performing DSP step comprises a constant modulus algorithm for adaptive polarization multiplexing.

13. The method of claim 8, wherein the performing DSP step comprises a polarization mode dispersion.

14. The method of claim 8, wherein the performing DSP step comprises a residual chromatic dispersion.

* * * * *